(12) United States Patent
Chong et al.

(10) Patent No.: US 11,097,223 B2
(45) Date of Patent: Aug. 24, 2021

(54) APPARATUS AND METHOD FOR REVERSE OSMOSIS

(71) Applicant: NANYANG TECHNOLOGICAL UNIVERSITY, Singapore (SG)

(72) Inventors: Tzyy Haur Chong, Singapore (SG); William B. Krantz, Singapore (SG); Siew Leng Loo, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 50 days.

(21) Appl. No.: 15/128,890

(22) PCT Filed: Mar. 31, 2015

(86) PCT No.: PCT/SG2015/000108
§ 371 (c)(1),
(2) Date: Sep. 23, 2016

(87) PCT Pub. No.: WO2015/152823
PCT Pub. Date: Oct. 8, 2015

(65) Prior Publication Data
US 2018/0243694 A1 Aug. 30, 2018

Related U.S. Application Data

(60) Provisional application No. 61/972,718, filed on Mar. 31, 2014.

(51) Int. Cl.
B01D 61/02 (2006.01)
B01D 61/08 (2006.01)
C02F 1/44 (2006.01)
B01D 61/12 (2006.01)
C02F 103/08 (2006.01)

(52) U.S. Cl.
CPC ........... *B01D 61/022* (2013.01); *B01D 61/08* (2013.01); *B01D 61/12* (2013.01); *C02F 1/441* (2013.01);
(Continued)

(58) Field of Classification Search
CPC ...... B01D 61/022; B01D 61/12; B01D 61/08; B01D 2317/022; B01D 2317/025;
(Continued)

(56) References Cited

U.S. PATENT DOCUMENTS 4,312,755 A * 1/1982 Hwang ................ B01D 61/022
210/321.87
4,755,297 A 7/1988 Nerad et al.
(Continued)

FOREIGN PATENT DOCUMENTS

WO 2015152823 A1 10/2015

OTHER PUBLICATIONS

Ken Sutherland, "What is Nanofiltration", Working with water, Mar. 18, 2009.*
(Continued)

Primary Examiner — Krishnan S Menon

(57) ABSTRACT

An apparatus for reverse osmosis, the apparatus comprising: a single-stage reverse osmosis (SSRO) unit; and a counter-current membrane cascade with recycle (CMCR) unit comprising a plurality of stages of reverse osmosis including at least a first stage and a second stage wherein permeate from the first stage is configured to be introduced as feed to the second stage; wherein retenate from the SSRO unit is configured to be introduced as feed to the first stage, and wherein product obtained using the apparatus comprises permeate from the SSRO unit and permeate from a last stage of the CMCR unit.

10 Claims, 3 Drawing Sheets

(52) U.S. Cl.
CPC .. *B01D 2317/022* (2013.01); *B01D 2317/025* (2013.01); *B01D 2317/04* (2013.01); *C02F 2103/08* (2013.01); *Y02A 20/131* (2018.01)

(58) Field of Classification Search
CPC .. B01D 2317/04; C02F 1/441; C02F 2103/08; Y02A 20/131
See application file for complete search history.

(56) References Cited

U.S. PATENT DOCUMENTS

| | | |
|---|---|---|
| 8,152,999 B2 | 4/2012 | Lightfoot, Jr. et al. |
| 2005/0035048 A1* | 2/2005 | Chancellor .......... B01D 61/022 210/321.89 |
| 2005/0045029 A1 | 3/2005 | Colling et al. |
| 2012/0145635 A1* | 6/2012 | Lucas, III ............ B01D 61/022 210/652 |
| 2014/0021135 A1* | 1/2014 | Sawyer .................. C02F 1/445 210/652 |

OTHER PUBLICATIONS

Foreign Communication From a Related Counterpart Application, International Search Report and Written Opinion dated May 18, 2015, International Application No. PCT/SG2015/000108 filed on Mar. 30, 2015.

* cited by examiner

APPARATUS AND METHOD FOR REVERSE OSMOSIS

CROSS-REFERENCE TO RELATED APPLICATIONS

The present application is a filing under 35 U.S.C. 371 as the National Stage of International Application No. PCT/SG2015/000108, filed Mar. 31, 2015, entitled "APPARATUS AND METHOD FOR REVERSE OSMOSIS," which claims the benefit of U.S. Provisional Application No. 61/972,718 filed on Mar. 31, 2014, both of which are incorporated herein by reference in their entirety for all purposes

FIELD OF THE INVENTION

This invention relates to an apparatus and method of reverse osmosis for product recovery from an aqueous solution.

BACKGROUND OF THE INVENTION

There is a continuing need to improve the efficiency and reduce the cost of supplying potable water owing to the pressures of an expanding world population, changing demographics, and global climate change. In 2010 the World Water Council reported that one in six people in the world (1.1 billion people in 2010) lack access to safe drinking water. The oceans that contain 97% of the water on earth are a major resource. However, ocean water can contain as much as 50000 parts per million (ppm) of salt (sodium chloride), which makes it unfit for human consumption without treatment. Reverse osmosis (RO) has emerged as a major technology for producing potable water from seawater as well as inland brackish water whose salt content ranges from 500 ppm to 30000 ppm. RO uses a salt-rejecting membrane under high pressure in order to force water to permeate through the membrane while rejecting the salt and other solutes. However, the current art in RO requires a very high pressure, typically 40 bars or more, which contributes significantly to the cost of water desalination. Moreover, the current art in RO has a limited potable water recovery, typically 50%. As a result, the specific energy consumption (SEC) for producing potable water from saline water is quite high.

The theoretical minimum SEC for conventional single-stage RO (SSRO) is 3.084 kwh/m$^3$ (kilowatt hours of energy per cubic meter of product water) to produce a potable water product containing 350 ppm from seawater containing 35000 ppm of salt at a pressure of 55.5 bar with a water recovery of 50% using a membrane with a salt rejection of 0.993. The SEC for the current RO process technology is high because of the high pressure required and the relatively low recovery of potable water product. The required pressure is high because of the large difference between the salt concentration on the retentate or high pressure side of the membrane and the permeate or low pressure side of the membrane. High pressures are also required for the separation of low molecular weight solutes such as ethanol from aqueous solutions owing to the osmotic pressure differential.

SUMMARY OF INVENTION

An apparatus for an energy-efficient reverse osmosis (EERO) process of the present invention has a novel multistage membrane configuration that enables higher product recovery from aqueous solutions containing salts or low molecular weight solutes such as ethanol at a reduced specific energy consumption (SEC) and a reduced osmotic pressure differential. Exemplary applications of the process include recovery of potable water from saline or wastewater at a reduced specific energy consumption and reduced osmotic pressure differential compared to current methods.

The present EERO invention described here achieves the reduction in the SEC, a reduction in the osmotic pressure differential (OPD), and an increase in the potable water recovery via a novel multistage RO process technology that involves combining single-stage reverse osmosis (SSRO) with a counter-current membrane cascade with recycle (CMCR) employing two or more RO stages.

In one embodiment, the retentate product from the high pressure side of the SSRO is introduced optimally at a point between two stages in the CMCR. In the CMCR, the retentate stream and permeate streams flow counter-currently to each other. The retentate stream will be referred to as flowing in the upstream direction, whereas the permeate stream will be referred to as flowing in the downstream direction.

Permeate recycle involves sending the permeate stream from an upstream stage to the retentate (high pressure) side of a stage immediately downstream from it. The permeate (e.g. potable water) product stream from the SSRO-CMCR integrated process is the combination of the permeate product stream from the SSRO and the permeate product stream from the last stage in the CMCR. The counter-current flow in combination with permeate recycle in the CMCR significantly reduces the concentration difference across the membrane in each stage of the CMCR, thereby reducing the OPD, and increases the potable water recovery since some water that would have been lost in the retentate effluent from the SSRO passes through the membranes in the CMCR stages and thereby is recovered in the permeate product from the CMCR.

According to a first aspect, there is provided an apparatus for reverse osmosis, the apparatus comprising: a single-stage reverse osmosis (SSRO) unit; and a counter-current membrane cascade with recycle (CMCR) unit comprising a plurality of stages of reverse osmosis including at least a first stage and a second stage wherein permeate from the first stage is configured to be introduced as feed to the second stage; wherein retentate from the SSRO unit is configured to be introduced as feed to the first stage, and wherein product obtained using the apparatus comprises permeate from the SSRO unit and permeate from a last stage of the CMCR unit.

The last stage may be the second stage and retentate from the second stage may be configured to be introduced as feed to the first stage together with retentate from the SSRO unit.

The SSRO unit may be configured to have a same osmotic pressure differential (OPD) as OPD in each of the plurality of reverse osmosis stages of the CMCR unit.

Alternatively, the first stage may be configured to have an OPD less than OPD in the SSRO unit. The second stage may be configured to have an OPD greater than OPD in the SSRO unit.

Further alternatively, the retentate from the second stage may be configured to be introduced as feed to the first stage together with retentate from the SSRO unit, the last stage of the CMCR unit may be a third stage, permeate from the second stage may be configured to be introduced as feed to the third stage, and retentate from the third stage may be configured to be introduced as feed to the second stage.

The first stage may be configured to have an OPD less than OPD in the second stage and the second stage may be configured to have an OPD less than OPD in the SSRO unit.

Further alternatively, the plurality of stages of the CMCR unit may comprise at least four stages, retentate from the SSRO unit may be configured to be introduced as feed to one of the at least four stages, and feed supplied from only within the CMCR unit to the one of the at least four stages may have a concentration closest to concentration of the retentate from the SSRO unit.

For all embodiments above, the SSRO unit may comprise a plurality of reverse osmosis membrane modules connected in parallel.

Each of the plurality of stages in the CMCR unit may comprise a plurality of reverse osmosis membrane modules connected in parallel.

Membrane rejection in each of the plurality of stages in the CMCR unit may decrease in the direction of retentate flow in the CMCR unit.

Each of the plurality of stages in the CMCR may comprise a recycle stream from its retentate stream to its permeate stream.

At least one of the plurality of stages in the CMCR is configured to have a portion of its retentate recycled as feed to itself.

Safety factor for one of the plurality of stages in the CMCR may be configured to be less than one.

According to a second aspect, there is provided a method of reverse osmosis, the method comprising the steps of: introducing feed of an aqueous solution into a single-stage reverse osmosis (SSRO) unit; introducing retentate from the SSRO unit into a first stage of a CMCR unit comprising a plurality of stages of reverse osmosis including at least the first stage and a second stage; introducing permeate from the first stage as feed to the second stage; and collecting as product permeate from the SSRO unit and permeate from a last stage of the CMCR unit.

The last stage may be the second stage and the method may further comprise introducing retentate from the second stage as feed to the first stage together with retentate from the SSRO unit.

Osmotic pressure differential (OPD) in the SSRO unit may be the same as OPD in each of the plurality of reverse osmosis stages of the CMCR unit.

Alternatively, OPD in the first stage may be less than OPD in the SSRO unit. OPD in the second stage may be greater than OPD in the SSRO unit.

Further alternatively, the last stage of the CMCR unit may be a third stage and the method may further comprise introducing retentate from the second stage as feed to the first stage together with retentate from the SSRO unit, introducing permeate from the second stage as feed to the third stage, and introducing retentate from the third stage as feed to the second stage.

OPD in the first stage may be less than OPD in the second stage and OPD in the second stage may be less than OPD in the SSRO unit.

Further alternatively, plurality of stages of the CMCR unit may comprise at least four stages and the method may comprise: introducing retentate from the SSRO unit as feed to one of the at least four stages, wherein feed from within the CMCR unit to the one of the at least four stages has a concentration closest to concentration of the retentate from the SSRO unit.

The method may further comprise, for each of the plurality of stages in the CMCR, recycling part of its retentate stream to its permeate stream.

The method may further comprise, for at least one of the plurality of stages in the CMCR, recycling a portion of its retentate as feed to itself.

Safety factor for one of the plurality of stages in the CMCR may be less than one.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
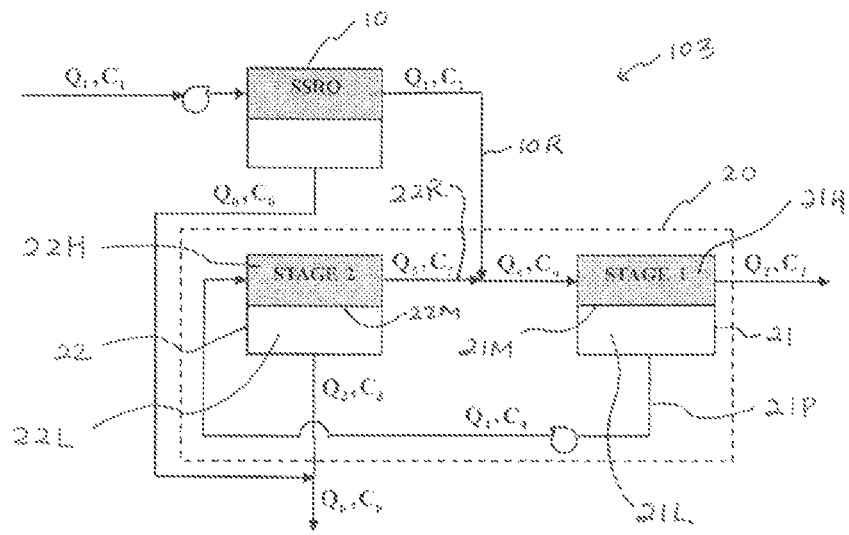
FIG. 1 is a schematic illustration of a three-stage embodiment of the present EERO invention.

Exemplary embodiments of the energy-efficient reverse osmosis (EERO) process of the invention will be described below with reference to FIGS. 1 to 6 in which the same reference numerals are used throughout to refer to the same or similar parts.

As shown in FIG. 1, in a first embodiment of an apparatus and method of the present EERO invention 103, high pressure retentate 10R from an SSRO stage 10 is the feed to a counter-current flow membrane cascade CMCR unit 20 having two stages, 21, 22, with permeate 21P recycle from stage 1 (21) to the high pressure or retentate side 22H of stage 2 (22). This will be referred to as a three-stage embodiment 103 of EERO since it is a hybrid configuration of an SSRO stage 10 and two stages 21, 22 in the CMCR unit 20.

The SSRO stage 10 comprises one or more RO modules connected in parallel (not shown). In the CMCR unit 20, each of the stages 21 and 22 can comprise one or more membrane modules connected in parallel (not shown). The direction of retentate flow in the CMCR unit 20 is referred to as the upstream direction (indicated as to the right in FIG. 1) and the direction of permeate flow in the CMCR unit 20 is referred to as the downstream direction (indicated as to the left in FIG. 1).

In FIG. 1, the retentate (high pressure) stream 10R from the SSRO unit 10 is introduced between the two stages 21, 22 in the CMCR unit 20. The CMCR unit 20 can be operated at the same pressure as the retentate stream 10R from the SSRO unit 10, thereby implying that no booster pump is required for the feed to the CMCR unit 20. When more than two stages 21, 22 are employed in the CMCR unit 20, all the stages can be operated at the same pressure, thereby implying that no interstage pumping is required on the high pressure side of the CMCR unit 20 membrane cascade. Alternatively, the pressure can be reduced between successive stages in the direction of the retentate flow in the CMCR unit 20 in order to reduce the OPD at the expense of a reduced water recovery.

The manner in which the EERO process of the present invention reduces the SEC while reducing the OPD and increasing water recovery will first be explained in qualitative terms below, after which the embodiment shown in FIG. 1 will be analyzed in detail quantitatively. Note that the analysis performed is for operation at the thermodynamic limit, which implies that the pressure is just equal to that required to overcome the OPD owing to the concentration difference between the high and low pressure sides of the membrane of each membrane module. No allowance is made for small pressure losses in the lines leading to and from the membrane stages or within the membrane modules on the high pressure side or to cause permeation through the membranes. This is standard practice in determining the efficiency of a membrane process and will be used both in assessing the performance of the various embodiments of the present EERO process as well as determining the performance of conventional SSRO, which is used as a basis for comparison.

The present EERO process combines SSRO unit 10, which by itself can achieve a recovery as high as 50%, when operated at a pressure of 55.5 bar for a saline water feed containing 35000 ppm using a membrane having a 0.993 rejection, with a CMCR unit 20, by sending the retentate stream 10R from the SSRO unit 10 as the feed to the CMCR unit 20.

In the embodiment of FIG. 1, the retentate stream 10R from the SSRO unit 10 is introduced as the feed between stage 1 (21) and stage 2 (22) of the CMCR unit 20. By introducing the retentate 10R from the SSRO unit 10 as feed to the CMCR unit 20, more water can be recovered, which contributes to decreasing the SEC. This can be done without any increase in the pressure in order to minimize the pumping costs that contribute to the SEC.

Hence, one configuration of the present EERO invention involves operating the CMCR unit 20 at the same pressure as the retentate stream 10R from the SSRO unit 10 and not employing any interstage pumping on the high pressure (retentate) side of the CMCR unit 20. Since the retentate from the SSRO unit 10 has a higher salt concentration than that of the saline water feed to the SSRO unit 10, operating the CMCR unit 20 without any interstage pumping requires reducing the OPD in the CMCR unit 20. This is done by permeate 21P recycle from stage 1 (21) to the high pressure side 22H of stage 2 (22) in the CMCR unit 20, while at the same time using a membrane 21M in stage 1 (21) that passes more salt than the highly rejecting membrane 22M used in stage 2 (22). Also, by configuring the membrane rejection in stages 21, 22 of the CMCR unit 20 to decrease in the direction of the retentate flow in the CMCR unit, some permeation of salt or other solutes from the high to the low pressure side of the membranes is permitted in order to reduce the OPD.

Thus, the combination of permeate 21P recycle to the high pressure side 22H and some salt permeation from the high pressure side 21H to the permeate side 21L of the membrane 21M in stage 1 (21) reduces the concentration difference across the membranes in both stages 1 and 2, thereby permitting a high recovery of potable water from the SSRO unit 10 and the permeate side 22L of stage 2 (22) of the CMCR unit 20, without the need to increase the pressure beyond that of the retentate stream 10R from the SSRO unit 10. Another embodiment of the EERO invention would allow for a pressure decrease from the point at which the feed 10R is introduced in the direction of the retentate flow 22R from the stage 2 (22) of the CMCR unit 20, which is to the right in FIG. 1.

In order to demonstrate in quantitative terms that this EERO invention that combines SSRO unit 10 with CMCR unit 20 can achieve a higher recovery at a reduced OPD and SEC relative to conventional SSRO unit 10, which is the industry standard, mathematical equations describing the interrelationship between the volumetric flow rates denoted by $Q_i$ in FIG. 1, and the concentrations expressed as mass per unit volume and denoted by $C_i$ in FIG. 1, where the subscript 'i' denotes the location of the particular stream or concentration, will be solved analytically as shown below. The solution to this system of algebraic equations will permit determining the recovery, OPD, SEC, and required rejection in each stage of the CMCR unit 20.

The system of algebraic equations is developed below by first considering the equations that describe the performance of the SSRO unit 10 and then considering those that describe the performance of the CMCR unit 20.

An overall mass balance and a component mass balance on the SSRO unit 10 stage shown in FIG. 1 is given by the following equations:

$$Q_f = Q_0 + Q_1 \tag{1}$$

$$Q_f C_f = Q_0 C_0 + Q_1 C_1 \tag{2}$$

Equations (1) and (2) constitute two equations with six unknowns. Hence, four quantities need to be specified for this to be a deterministic system, that is, a system for which all the unknown quantities can be determined. Here we will specify the feed flow rate, $Q_f$, the feed concentration, $C_f$, the concentration of the potable water product, $C_0$, and the OPD, $\Delta\pi$, which is related to the retentate and permeate concentrations and is given by the following:

$$\Delta\pi = K(C_1 - C_0) \tag{3}$$

where K=0.801 L·bar/g is an empirical constant. Alternatively, any one of the following quantities could be specified: the recovery, $S \equiv Q_0/Q_f$, safety factor, $\chi \equiv Q_1/Q_0$, or the membrane rejection, $\sigma \equiv \frac{1}{2}(C_f + C_1)/C_0$. Equations (1), (2), and (3) can be solved simultaneously for the unknown concentration $C_1$ and volumetric flow rates, $Q_0$ and $Q_1$. The recovery, $Y_{SSRO}$, SEC=$Q_f\Delta\pi/Q_0$, and concentration $C_1$ and flow rate $Q_1$ of the retentate for the SSRO unit 10 then can be determined in terms of the initially specified quantities and are given by the following:

$$Y_{SSRO} = 1 - \frac{K}{\Delta\pi}(C_f - C_0) \tag{4}$$

$$SEC = \frac{K(C_f - C_0)}{Y_{SSRO}(1 - Y_{SSRO})} \tag{5}$$

$$\sigma = \frac{K(C_f - C_0) + \Delta\pi}{K(C_f + C_0) + \Delta\pi} \tag{6}$$

$$C_1 = \frac{\Delta\pi}{K} + C_0 \tag{7}$$

$$Q_1 = \frac{KQ_f}{\Delta\pi}(C_f - C_0) \quad (8)$$

The system of equations that describe the CMCR unit 20 is given below. An overall mass balance and a component mass balance on stages 1 (21) and 2 (22) and an overall solute mass balances at the point where streams $Q_1$ and $Q_5$ mix to form stream $Q_6$ are given by the following equations:

$$Q_4 = Q_3 + Q_5 \quad (9)$$

$$Q_6 = Q_2 + Q_4 \quad (10)$$

$$Q_6 = Q_1 + Q_5 \quad (11)$$

$$Q_4 C_4 = Q_3 C_3 + Q_5 C_5 \quad (12)$$

$$Q_6 C_6 = Q_2 C_2 + Q_4 C_4 \quad (13)$$

Equations (9) through (14) constitute 6 equations with 12 unknowns that involve the 6 flow rates, $Q_1$ through $Q_6$, and the 6 concentrations, $C_1$ through $C_6$. This implies 6 degrees of freedom. Since there are 3 equations involving just the flow rates and 3 equations involving the products of a flow rate and a concentration, at most 3 flow rates or quantities involving the flow rates can be specified.

Since the present EERO invention involves sending the retentate stream 10R from the SSRO unit 10 as the feed to the CMCR unit 20, the concentration $C_1$ and volumetric flow rate $Q_1$ are specified. The potable water product concentration from the CMCR unit 20 membrane cascade, $C_3$, will be specified to be the same as that specified for the SSRO unit 10; that is, $C_3 = C_0$. This implies that the overall potable water product concentration $C_p = C_3 = C_0$.

A possible option to the present EERO invention is to specify two additional flow rates or quantities involving the flow rates and one additional equation involving the concentration or an additional quantity involving the concentrations. For the present, as a proof-of-concept for the present EERO invention, recoveries $Y_1$ and $Y_2$ in stages 1 (21) and 2 (22) of the CMCR unit 20, respectively, will be specified and the OPD in stage 1 (21) will be set equal to the OPD in stage 2 (22) so that no interstage pumping on the high pressure side of the membrane cascade is required; other embodiments of the present EERO invention involving more than two stages in the CMCR unit 20 could specify that the OPD be equal in all stages or that there be a progressive decrease in the OPD in the upstream direction:

$$Y_1 = \frac{Q_4}{Q_6} \quad (15)$$

$$Y_2 = \frac{Q_3}{Q_4} \quad (16)$$

$$K(C_2 - C_4) = K(C_5 - C_3) \quad (17)$$

Equations (9) through (17) can be solved simultaneously for the unknown concentrations and volumetric flow rates, which are given by the following equations:

$$Q_2 = \frac{(1-Y_1)}{1-(1-Y_2)Y_1}Q_1 \quad (18)$$

$$Q_3 = \frac{Y_1 Y_2}{1-(1-Y_2)Y_1}Q_1 \quad (19)$$

$$Q_4 = \frac{Y_1}{1-(1-Y_2)Y_1}Q_1 \quad (20)$$

$$Q_5 = \frac{(1-Y_2)Y_1}{1-(1-Y_2)Y_1}Q_1 \quad (21)$$

$$Q_6 = \frac{1}{1-(1-Y_2)Y_1}Q_1 \quad (22)$$

$$C_2 = \frac{Q_1 C_1 - Q_3 C_3}{Q_2} \quad (23)$$

$$C_4 = \frac{Q_6 C_6 - Q_2 C_2}{Q_4} \quad (24)$$

$$C_5 = \frac{(Q_4 - Q_2)C_1 + (Q_2)^2 C_2 + (Q_2 - Q_3)Q_4 C_3}{Q_2(Q_4 + Q_5)} \quad (25)$$

$$C_6 = \frac{Q_1 C_1 + Q_5 C_5}{Q_6} \quad (26)$$

Equations (18) through (26) permit determining the OPD, $\Delta\pi$, which is the same in each of the two stages 21, 22 in the CMCR unit 20, and is given by the following:

$$\Delta\pi = K\frac{(Q_4 - Q_2)C_1 + (Q_2)^2 C_2 - (Q_3 Q_4 + Q_2 Q_5)C_3}{Q_2(Q_4 + Q_5)} \quad (27)$$

The overall recovery $Y_T$ for the three-stage embodiment 103 of the present EERO invention is determined from the potable water produced by the SSRO unit 10 and that produced by the CMCR unit 20, and is given by the following:

$$Y_T = Y_{SSRO} + Q_3(1 - Y_{SSRO}) \quad (28)$$

The SEC for the three-stage embodiment 103 of the EERO invention is determined from the pumping requirement for the SSRO unit 10, the pumping requirement for the permeate recycle stream 21P in the CMCR unit 20, and the overall water recovery, and is given by the following:

$$SEC = \frac{1 + Q_4(1 - Y_{SSRO})}{Y_{SSRO} + Q_3(1 - Y_{SSRO})}\Delta\pi \quad (29)$$

The rejection in stage 1 (21) and the rejection in stage 2 (22) for the three-stage embodiment 103 of the EERO invention are given by the following:

$$\sigma_1 = \frac{C_6 + C_2 - 2C_4}{C_6 + C_2} \quad (30)$$

$$\sigma_2 = \frac{C_4 + C_5 - 2C_3}{C_4 + C_5} \quad (31)$$

Figure 2:
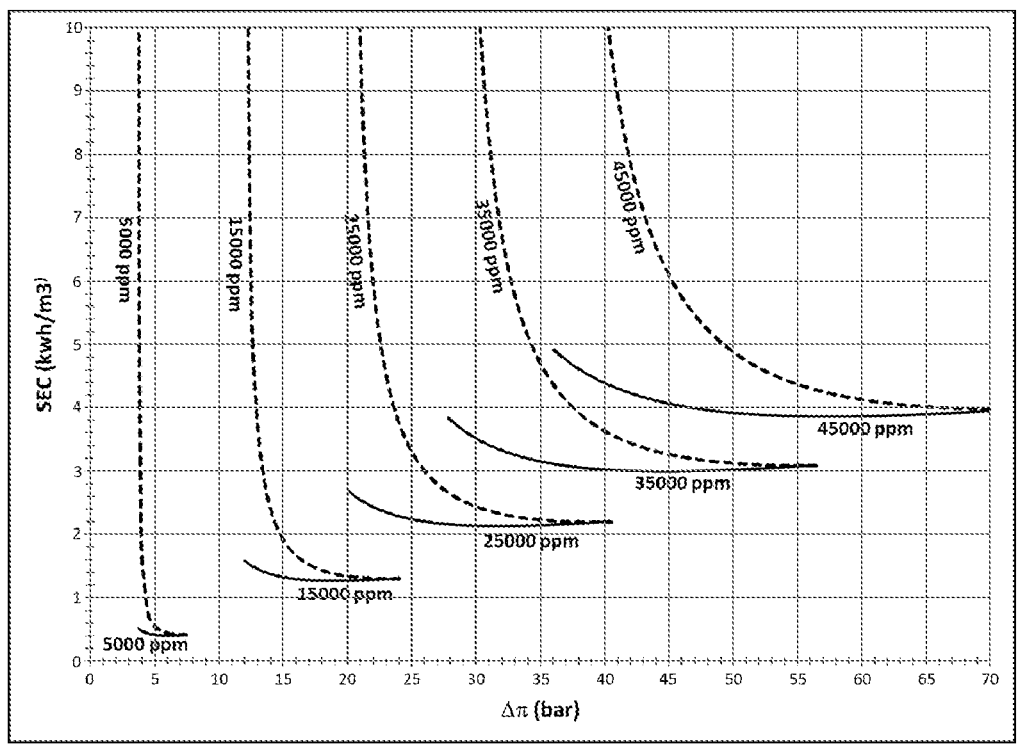
FIG. 2 is a graph of specific energy consumption SEC as a function of the OPD, $\Delta\pi$, for a range of saline water feed concentrations: solid lines are data from a three-stage embodiment of the present EERO invention and dashed lines are data from a conventional SSRO process.

Solid lines in FIG. 2 are a plot of the SEC predicted by Equation (29) as a function of the OPD, $\Delta\pi$, for a range of values of the feed concentration to the SSRO unit 10, $C_f$, for the three-stage embodiment 103 of the present EERO invention. The range of OPD for which the predictions are shown is limited at some high value when the safety factor in the SSRO unit 10 stage of the present EERO invention becomes less than one and at some low OPD when the SSRO unit 10 no longer can achieve the specified potable water product concentration $C_0=C_3=C_p$ for the specified saline water feed concentration $C_f$.

Note that operating practice for RO is to maintain the safety factor, which is the ratio of the retentate flow rate to the permeate flow rate for the same membrane stage, at a value greater than or equal to one in order to minimize membrane fouling. Since most of the fouling agents will be removed in the SSRO unit 10 and in stage 1 (21) of the CMCR unit 20, stage 2 (22) of the CMCR unit 20 could be operated at a lower value of the safety factor that would further reduce the SEC. This constitutes another configuration of the present EERO invention.

As a basis of comparison, the dashed lines in FIG. 2 show the SEC predicted by Equation (5) as a function of the OPD, $\Delta\pi$, for the same range of values of the feed concentration, $C_f$, for a conventional SSRO in the absence of the two-stage CMCR unit 20. The range of OPD for which the predictions for just the SSRO alone is again limited at some high value when the safety factor becomes less than one and at some low value when the SSRO alone can no longer achieve the specified water product concentration, $C_0$, for the specified saline water feed concentration, $C_f$. At any specified feed concentration and OPD, an EERO embodiment of the present invention that combines SSRO unit 10 with two-stage CMCR unit 20 is seen to give a lower SEC than the SEC that can be achieved with a conventional SSRO by itself.

Figure 3:
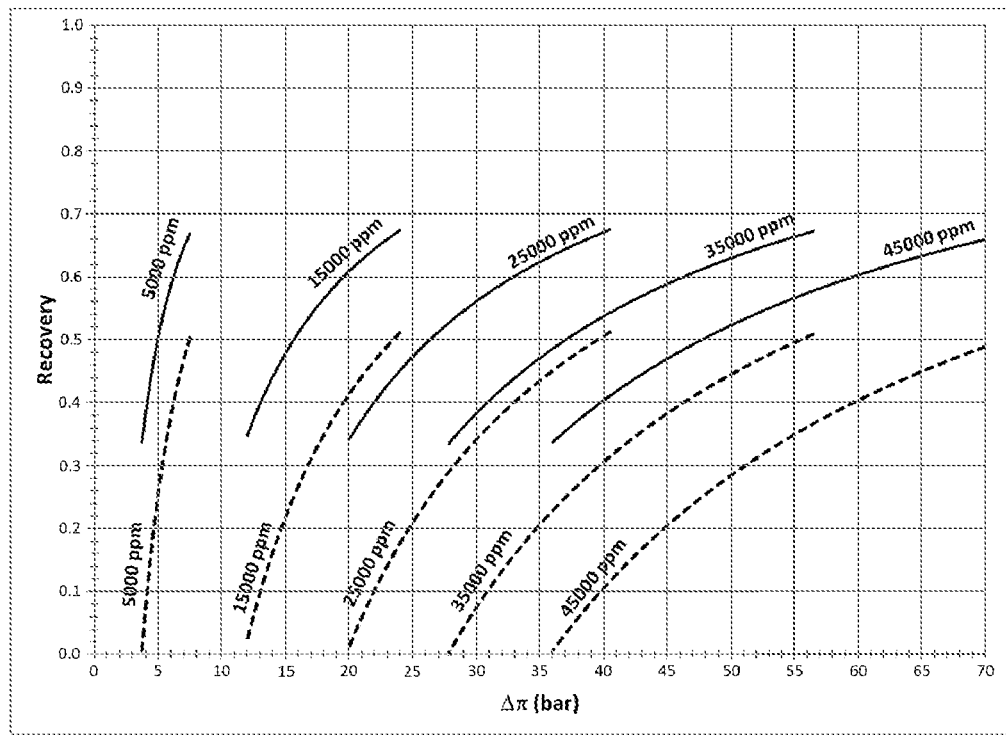
FIG. 3 is a graph of potable water recovery as a function of the OPD, $\Delta\pi$, for a range of saline water feed concentrations: solid lines are data from a three-stage embodiment of the present EERO invention and dashed lines are data from a conventional SSRO process.

The results summarized in FIGS. 2 and 3 indicate that the three-stage embodiment 103 of the present EERO invention can achieve a higher water recovery at a lower OPD and reduced SEC relative to conventional SSRO. For example, for a saline water feed containing 35000 ppm of salt, the three-stage embodiment 103 of the present EERO invention can achieve a potable water recovery of 59% at an OPD of 44.7 bar with an SEC of 2.998 kwh/m$^3$. At the minimum allowable safety factor of 1.0 the maximum potable water recovery possible via conventional SSRO is only 50%, which requires an OPD of 55.5 bar and an SEC of 3.087 kwh/m$^3$. Hence, when the three-stage embodiment 103 of the present EERO invention is operated optimally, it can achieve an 18% increase in recovery, while decreasing the OPD by 19% and reducing the SEC by 2.9%.

If, rather than operating the three-stage embodiment 103 of the present EERO invention at its optimal point insofar as reducing the SEC, it is operated at conditions corresponding to an SEC of 3.087 for which conventional SSRO achieves optimal performance, the three-stage embodiment 103 of the present EERO invention can achieve a recovery of 66.7% at an OPD of 55.5 bar. This represents a 33% increase in recovery with no increase in the OPD or SEC relative to conventional SSRO.

If the safety factor in stage 2 of this three-stage embodiment 103 of the present EERO invention is allowed to be reduced to a value of less than one owing to removal of foulants in the SSRO and in stage 1 (i.e., stages that precede stage 2 in terms of direction of the retentate flow), the performance can be further improved. For example, if the safety factor in stage 2 is reduced to 0.67, the three-stage embodiment 103 of the EERO invention can achieve a recovery of 59% at an OPD of 47.9 bar and an SEC of 2.811 kwh/m$^3$. This represents an 18% increase in recovery with a decrease in the OPD of 14% and a reduction in the SEC of 8.9% relative to conventional SSRO.

Figure 4:
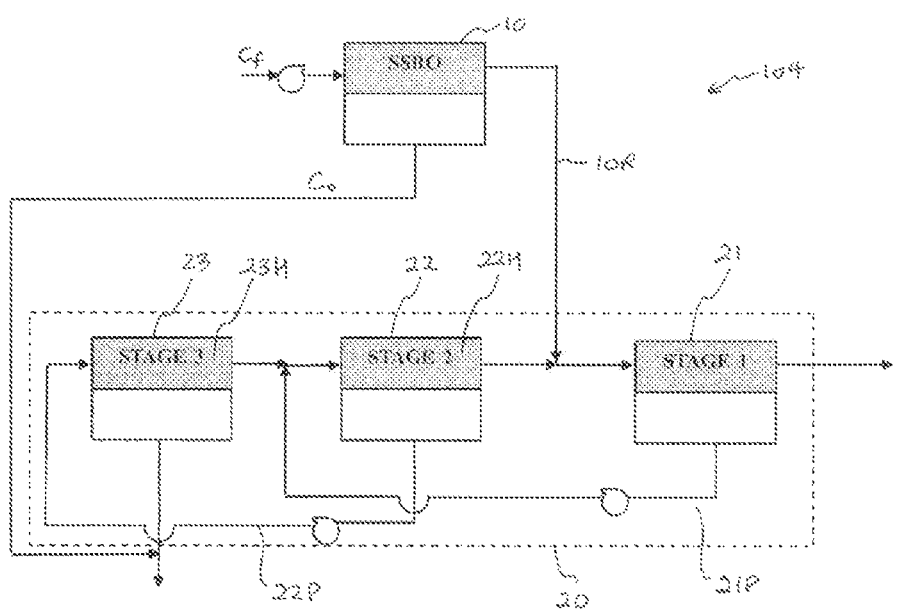
FIG. 4 is a schematic illustration of a four-stage embodiment of the present EERO invention.

A second embodiment 104 of the EERO invention involves combining SSRO with a three-stage CMCR as shown in FIG. 4, in which high pressure retentate 10R from an SSRO stage 10 is the feed to a three-stage countercurrent membrane cascade (CMCR) 20 with permeate recycle 21P from stage 1 (21) to the high pressure side 22H of stage 2 (22) and with permeate recycle 22P from stage 2 (22) to the high pressure side 23H of stage 3 (23). This embodiment will be referred to as the four-stage embodiment 104 of the present EERO invention. When more than two stages are used in the CMCR unit 20, the retentate stream 10R from the SSRO unit 10 is introduced optimally between two stages in the CMCR unit 20 in which the optimal point is that at which the concentration of the feed 10R is closest to that of the combined flows of the retentate (e.g., 22R) from the stage (e.g., 22) immediately downstream and the permeate recycle stream (e.g., 21P) from the stage (e.g., 21) immediately upstream of the point at which the feed 10R is introduced. In other words, retentate 10R from the SSRO unit 10 is configured to be introduced as feed to one of the stages of the CMCR unit 20 wherein feed from within the CMCR unit 20 to that one of the stages has a concentration closest to concentration of the retentate 10R from the SSRO unit.

Analysis of the performance of the second embodiment 104 of the EERO invention proceeds in a similar manner to that used in analyzing the three-stage embodiment 103 of FIG. 1 as described above. However, the overall and solute mass balances need to be done for an additional stage and at the additional mixing point required for permeate recycle 22P from stage 2 (22) to the high pressure side 23H of stage 3 (23). The resulting 8 equations involve 16 unknowns that constitute 8 flow rates and 8 concentrations, thereby implying 8 degrees of freedom in solving the system of equations associated with the four-stage embodiment 104 of the present EERO invention. These are chosen to be the feed flow rate and concentration, potable water product concentration, the recoveries in each of the three stages, and the two equations that result from setting the OPD equal in all three stages 21, 22, 23 of the CMCR unit 20. Since the analysis is straightforward following the working described above for the three-stage embodiment 103, the details will not be given here for the four-stage embodiment 104.

Figure 5:
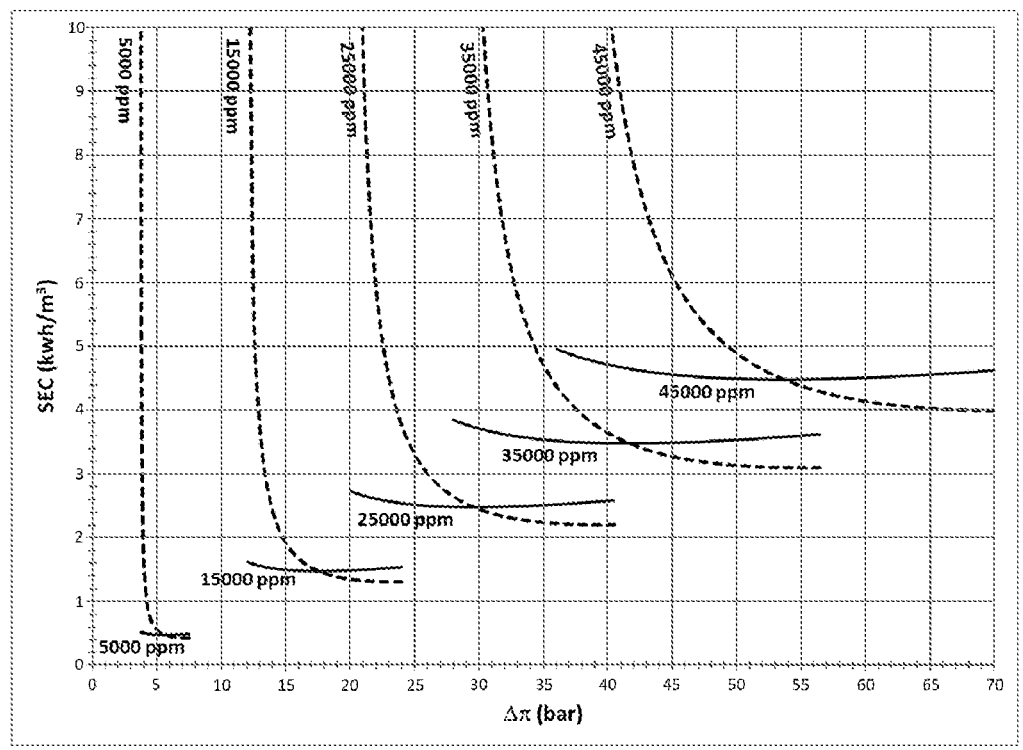
FIG. 5 is a graph of specific energy consumption SEC as a function of the OPD, $\Delta\pi$, for a range of saline water feed concentrations: solid lines are data from a four-stage embodiment of the present EERO invention and dashed lines are data from a conventional SSRO process.

The solid lines in FIG. 5 are a plot of the SEC predicted for the four-stage embodiment 104 of the present EERO invention as a function of the OPD, $\Delta\pi$, for a range of values of the feed concentration, $C_f$, to the SSRO unit 10. The range of OPD for which the predictions are shown again is limited at some high value when the safety factor in the SSRO stage 10 of the EERO becomes less than one and at some low value of the OPD when the SSRO unit 10 can no longer achieve the specified potable water product concentration, $C_0$, for the specified saline water feed concentration, $C_f$. As a basis of comparison the dashed lines in FIG. 5 again show the SEC for conventional SSRO alone predicted by Equation (5) as a function of the OPD, $\Delta\pi$, for the same range of values of the feed concentration, $C_f$. The range of OPD for which the predictions for conventional SSRO is again limited at some high value when the safety factor becomes less than one and at some low value of the OPD when the conventional SSRO no longer can achieve the specified potable water product concentration, $C_0$, for the specified saline water feed concentration, $C_f$.

In contrast to the three-stage embodiment of this invention as shown in FIG. 1, the four-stage embodiment shown 104 does not give a lower SEC for all values of the OPD. Moreover, conventional SSRO is seen to have a lower SEC if operated optimally, although the four-stage embodiment 104 of the present invention has a lower SEC below a certain OPD that decreases with decreasing salt concentration in the feed to the SSRO unit 10. For example, for a saline water feed concentration of 35,000 ppm, the four-stage embodiment 104 of the present invention has a lower SEC than conventional SSRO for any OPD less than 42 bar.

Figure 6:
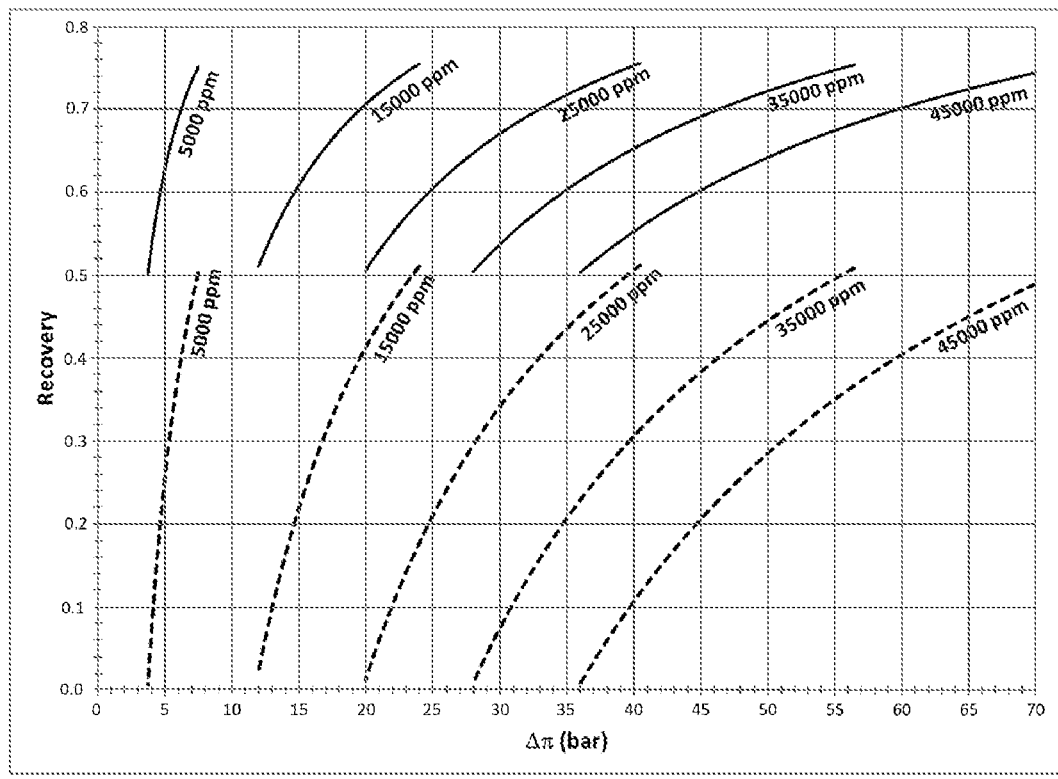
FIG. 6 is a graph of potable water recovery as a function of the OPD $\Delta\pi$ for a range of saline water feed concentrations: solid lines are data from a four-stage embodiment of the present EERO invention and dashed lines are data from a conventional SSRO process.

The solid lines in FIG. 6 are a plot of the total recovery, $Y_T$, for the four-stage embodiment 104 of the present EERO invention as a function of the OPD, $\Delta\pi$, for a range of values of the feed concentration, $C_f$, to the SSRO unit 10. The four-stage embodiment 104 of the present EERO invention is seen to provide a significantly higher recovery than conventional SSRO for all feed concentrations. Moreover, the four-stage embodiment 104 of the present EERO invention is seen to provide a higher recovery than the three-stage embodiment 103 at all feed concentrations.

The results summarized in FIGS. 5 and 6 indicate that the four-stage embodiment 104 of the present EERO invention can achieve a significantly higher water recovery at a lower OPD and at an only slightly increased SEC relative to conventional SSRO. For example, when operated optimally at its lowest SEC for a saline water feed containing 35000 ppm of salt the four-stage embodiment of the EERO invention can achieve a potable water recovery of 67% at an OPD of 41.5 bar at an SEC of 3.472 kwh/m³. At the minimum allowable safety factor of 1.0, the maximum potable water recovery possible via conventional SSRO is only 50%, which requires an OPD of 55.5 bar and an SEC of 3.087 kwh/m³. Hence, when the four-stage embodiment 104 of the EERO invention is operated optimally, it can achieve a 34% increase in recovery, while decreasing the OPD by 25% at the expense of increasing the SEC by 12%.

For purposes of comparison, Table 1 below summarizes the minimum SEC, potable water recovery at the minimum SEC, OPD at the minimum SEC, and rejections in each stage at the minimum SEC for a range of saline water feed concentrations for conventional SSRO, the three-stage embodiment 103 of the present EERO invention, and the four-stage embodiment 104 of the present EERO invention. Table 1 indicates that the membrane rejections decrease in the direction of the retentate product flow. Achieving these rejections with commercial membranes can be done by employing a recycle stream from the retentate side to the permeate side of the same stage (not shown in the figures).

TABLE 1

| Conventional Single-Stage Reverse Osmosis (SSRO) | | | | | | |
|---|---|---|---|---|---|---|
| Feed Concentration (ppm) | Minimum SEC (kwh/m³) | Recovery at Minimum SEC | $\Delta\pi$ (bar) at Minimum SEC | Stage 1 Rejection | Stage 2 Rejection | Stage 3 Rejection |
| 45000 | 3.977 | 0.50 | 71.5 | 0.995 | NA | NA |
| 35000 | 3.086 | 0.50 | 55.5 | 0.993 | NA | NA |
| 25000 | 2.196 | 0.50 | 39.5 | 0.991 | NA | NA |
| 15000 | 1.305 | 0.50 | 23.5 | 0.984 | NA | NA |
| 5000 | 0.414 | 0.50 | 7.5 | 0.952 | NA | NA |
| EERO Hybrid Process-SSRO and Two-Stage Countercurrent Membrane Desalination with Permeate Recycle (CMCR)-Three-Stage Embodiment | | | | | | |
| Feed Concentration (ppm) | Minimum SEC (kwh/m³) | Recovery at Minimum SEC | $\Delta\pi$ (bar) at Minimum SEC | Stage 1 Rejection | Stage 2 Rejection | Stage 3 Rejection |
| 45000 | 3.863 | 0.59 | 57.5 | 0.598 | 0.994 | NA |
| 35000 | 2.998 | 0.59 | 44.7 | 0.597 | 0.992 | NA |
| 25000 | 2.133 | 0.59 | 32.0 | 0.596 | 0.989 | NA |
| 15000 | 1.268 | 0.59 | 19.0 | 0.593 | 0.981 | NA |
| 5000 | 0.402 | 0.59 | 6.0 | 0.578 | 0.941 | NA |
| EERO Hybrid Process-SSRO and Three-Stage Countercurrent Membrane Desalination with Permeate Recycle (CMCR)-Four-Stage Embodiment | | | | | | |
| Feed Concentration (ppm) | Minimum SEC (kwh/m³) | Recovery at Minimum SEC | $\Delta\pi$ (bar) at Minimum SEC | Stage 1 Rejection | Stage 2 Rejection | Stage 3 Rejection |
| 45000 | 4.474 | 0.67 | 53.5 | 0.427 | 0.598 | 0.993 |
| 35000 | 3.472 | 0.67 | 41.5 | 0.427 | 0.597 | 0.991 |
| 25000 | 2.470 | 0.67 | 29.5 | 0.426 | 0.596 | 0.987 |
| 15000 | 1.468 | 0.67 | 17.5 | 0.425 | 0.592 | 0.979 |
| 5000 | 0.466 | 0.67 | 5.6 | 0.417 | 0.577 | 0.937 |

The proof of concept for the present EERO invention has been shown in detail for the three-stage embodiment 103 involving SSRO unit 10 in combination with two-stage CMCR unit 20 and for the four-stage embodiment 104 involving SSRO unit 10 in combination with three-stage CMCR unit 20. The three-stage embodiment 103 of this invention has been shown to be a substantive improvement on conventional SSRO technology by providing an increased recovery at a reduced OPD and at a reduced SEC for all saline water feed concentrations. The four-stage embodiment 104 has been shown to significantly increase the water recovery while reducing the OPD with only a small increase in the SEC.

Other embodiments of the present EERO invention include adding four or more stages to the CMCR unit 20. Increasing the number of stages beyond three in the CMCR unit 20 will increase the recovery and further reduce the OPD relative to conventional SSRO, however at the expense of an increase in SEC relative to both conventional SSRO and the three-stage 103 and four-stage 104 embodiments of the present invention.

The proof-of-concept for the present EERO invention has been shown based on maintaining the same OPD in the SSRO stage 10 and in all the CMCR unit 20 stages. This configuration of the present EERO invention is advantageous since it avoids any interstage pumping on the high pressure side of the CMCR unit 20. A second configuration of the present EERO invention is to allow for a reduced OPD in one or more of the stages in the CMCR unit 20 while at the same time avoiding any interstage pumping on the high pressure side of the CMCR unit 20. This will reduce pumping costs at the expense of a reduced potable water recovery. For some applications, the second configuration of the present EERO invention could be desirable.

The present EERO invention has been compared with conventional SSRO based on the metrics of specific energy consumption, potable water recovery, and OPD. However, the reduction in OPD made possible by the present EERO invention will not only reduce the operating costs vis-à-vis the specific energy consumption, but also reduce the fixed costs since the pumps, membrane modules, and piping will not need to sustain the high pressures required for conventional SSRO. Moreover, the equipment maintenance costs will be reduced owing to operating at lower pressure.

Various embodiments of the EERO of the present invention as described above may thus be summarized as follows:

An EERO process that combines SSRO with two-stage CMCR whereby the retentate from the SSRO is the feed to the first stage of the CMCR using the convention that the CMCR stages are numbered from the retentate product end of the CMCR.

An EERO process that combines SSRO with two-stage CMCR whereby the OPD is the same in the SSRO and CMCR stages, neglecting small losses owing to pressure drop due to flow in the lines and on the high pressure side of the membrane modules or to cause permeation through the membranes.

An EERO process that combines SSRO with two-stage CMCR that achieves a higher potable water recovery from saline water at a lower OPD and at a reduced SEC than conventional SSRO.

An EERO process that combines SSRO with two-stage CMCR that achieves a higher product recovery from an aqueous feed stream containing relatively low molecular weight solutes at a lower OPD and at a reduced SEC than conventional SSRO.

An EERO process that combines SSRO with two-stage CMCR whereby the OPD is reduced in stage 1 relative to the OPD in the SSRO stage.

An EERO process that combines SSRO with two-stage CMCR whereby the OPD is increased in stage 2 relative to the OPD in the SSRO stage.

An EERO process that combines conventional SSRO with three-stage CMCR whereby the retentate from the SSRO is the feed to the second stage of the CMCR membrane cascade using the convention that the CMCR stages are numbered from the retentate product end of the CMCR.

An EERO process that combines conventional SSRO with three-stage CMCR whereby the retentate from the SSRO is the feed to the first stage of the CMCR using the convention that the CMCR stages are numbered from the retentate product end of the CMCR.

An EERO process that combines SSRO with three-stage CMCR whereby the OPD is the same in the SSRO and CMCR stages, neglecting small losses owing to pressure drop due to flow in the lines and on the high pressure side of the membrane modules or to cause permeation through the membranes.

An EERO process that combines SSRO with three-stage CMCR that achieves a higher potable water recovery from a saline water feed at a lower OPD than conventional SSRO.

An EERO process that combines SSRO with three-stage CMCR that achieves a higher product recovery from an aqueous feed stream containing relatively low molecular weight solutes at a lower OPD than conventional SSRO.

An EERO process that combines SSRO with three-stage CMCR whereby the OPD is reduced in stage 1 relative to the OPD in stage 2 and the OPD in stage 2 is reduced relative to the OPD in the SSRO stage.

An EERO process that combines conventional SSRO with a CMCR having more than three stages whereby the retentate from the SSRO is the feed to the stage in the CMCR at which its concentration is closest to that of the other streams entering this stage.

An EERO process that combines conventional SSRO with a CMCR having more than three stages that achieves a higher potable water recovery at a lower OPD than conventional SSRO.

An EERO process in which the SSRO stage consists of one or more RO membrane modules connected in parallel.

An EERO process in which each stage of the CMCR consists of one or more membrane modules connected in parallel.

An EERO process in which the rejections of the membrane stages in the CMCR decrease in the direction of the retentate product to permit some permeation of salt or other solutes from the high to the low pressure side of the membranes in order to reduce the OPD.

An EERO process in which the effective rejection in each stage of the CMCR is achieved by a recycle stream from the retentate stream to the permeate stream of the same stage.

An EERO process in which a portion of the retentate from one or more stages is recycled back to the feed to the same stage in order to increase the recovery.

An EERO process in which the safety factor in a stage, is allowed to be less than one owing to removal of sparingly soluble fouling agents in one or more stages that precede this stage in terms of the direction of the retentate flow.

Whilst there has been described in the foregoing description exemplary embodiments of the present invention, it will be understood by those skilled in the technology concerned that many variations in details of design, construction and/or operation may be made without departing from the present invention.

The invention claimed is:

1. An apparatus for reverse osmosis, the apparatus comprising:
   a single-stage reverse osmosis (SSRO) unit; and
   a counter-current membrane cascade with recycle (CMCR) unit comprising a plurality of stages of reverse osmosis including at least a first stage, a second stage, and a third stage, wherein each of the plurality of stages in the CMCR unit consists of a plurality of reverse osmosis membrane modules, and wherein the CMCR unit comprises no interstage pumping on retentate sides of the membrane cascade in the CMCR unit;
   wherein a first combined stream consisting of retentate from the SSRO unit and retentate from the second stage is configured to be introduced as feed without use of a pump to the first stage, wherein a second combined stream consisting of retentate from the third stage and permeate from the first stage is configured to be introduced as feed to the second stage without use of a pump, wherein the first stage is a stage at which concentration of the combined flows of the retentate from the second stage and the permeate from the first stage is closest to concentration of the retentate from the SSRO unit, wherein the SSRO unit is configured to have a same osmotic pressure differential (OPD) as OPD in each of the plurality of reverse osmosis stages of the CMCR unit, and wherein product obtained using the apparatus comprises permeate from the SSRO unit and permeate from a last stage of the CMCR unit.

2. The apparatus for reverse osmosis of claim 1, wherein the last stage of the CMCR unit is the third stage, and wherein permeate from the second stage is configured to be introduced as feed to the third stage.

3. The apparatus for reverse osmosis of claim 1, wherein the SSRO unit comprises a plurality of reverse osmosis membrane modules connected in parallel.

4. The apparatus for reverse osmosis of claim 1, wherein membrane rejection in each of the plurality of stages in the CMCR unit decreases in the direction of retentate flow in the CMCR unit.

5. The apparatus for reverse osmosis of claim 1, wherein one of the plurality of stages in the CMCR is configured to have a safety factor of less than one.

6. A method of reverse osmosis, the method comprising the steps of:
a) introducing feed of an aqueous solution into a single-stage reverse osmosis (SSRO) unit;
b) introducing retentate from the SSRO unit as feed to a counter-current membrane cascade with recycle (CMCR) unit, the CMCR unit comprising a plurality of stages of reverse osmosis including at least a first stage, a second stage, and a third stage, wherein each of the plurality of stages in the CMCR unit consists of a plurality of reverse osmosis membrane modules, and wherein the CMCR unit comprises no interstage pumping on retentate sides of the membrane cascade in the CMCR unit;
c) introducing a first combined stream consisting of the retentate from the SSRO unit and retentate from the second stage as feed to the first stage without use of a pump;
d) introducing a second combined stream consisting of retentate from the third stage and permeate from the first stage as feed to the second stage without use of a pump; and
e) collecting as product permeate from the SSRO unit and permeate from a last stage of the CMCR unit, wherein the first stage is a stage at which concentration of the combined flows of the retentate from the second stage and the permeate from the first stage is closest to concentration of the retentate from the SSRO unit, and wherein osmotic pressure differential (OPD) in the SSRO unit is the same as OPD in each of the plurality of reverse osmosis stages of the CMCR unit.

7. The method for reverse osmosis of claim 6, wherein the last stage of the CMCR unit is the third stage and further comprises introducing permeate from the second stage as feed to the third stage.

8. The method of reverse osmosis of claim 6, wherein safety factor for one of the plurality of stages in the CMCR is less than one.

9. The apparatus for reverse osmosis of claim 1, further comprising the retentate from the SSRO unit, the retentate from the second, and the first combined stream, wherein the first combined stream has a concentration closest to a concentration of the retentate from the SSRO unit, and wherein the first combined stream has a concentration such that the OPD in the first stage is the same as the OPD in the SSRO unit.

10. The apparatus for reverse osmosis of claim 9, further comprising the retentate from the third stage, the permeate from the first stage, and the second combined stream, wherein the second combined stream has a concentration such that the OPD in the second stage is the same as the OPD in the first stage.

* * * * *